United States Patent
Sikal et al.

(10) Patent No.: US 10,871,065 B2
(45) Date of Patent: Dec. 22, 2020

(54) METHOD FOR THE IDENTIFICATION OF THE POSITION OF A WELL BY PASSIVE MAGNETIC TELEMETRY

(71) Applicant: PATHCONTROL, Paris (FR)

(72) Inventors: Anas Sikal, Paris (FR); Denis Reynaud, Saint Maurice (FR); Ludovic Macresy, Paris (FR)

(73) Assignee: PATHCONTROL, Paris (FR)

( * ) Notice: Subject to any disclaimer, the term of this patent is extended or adjusted under 35 U.S.C. 154(b) by 415 days.

(21) Appl. No.: 15/916,040

(22) Filed: Mar. 8, 2018

(65) Prior Publication Data
US 2018/0267198 A1   Sep. 20, 2018

(30) Foreign Application Priority Data
Mar. 9, 2017   (FR) .................................. 17 51933

(51) Int. Cl.
*E21B 47/0228*   (2012.01)
*E21B 41/00*   (2006.01)
(Continued)

(52) U.S. Cl.
CPC ........ *E21B 47/092* (2020.05); *E21B 41/0092* (2013.01); *E21B 47/022* (2013.01);
(Continued)

(58) Field of Classification Search
None
See application file for complete search history.

(56) References Cited

U.S. PATENT DOCUMENTS

| 4,957,172 A | 9/1990 | Patton et al. |
| 5,103,920 A * | 4/1992 | Patton ........................ E21B 7/04 |
| | | 175/45 |

(Continued)

FOREIGN PATENT DOCUMENTS

WO   2012/134468 A1   10/2012

OTHER PUBLICATIONS

Collision Avoidance Work Group, Collision Avoidance Calculations—Current Common Practice, Industry Steering Committee on Wellbore Survey Accuracy (Year: 2013).*

(Continued)

*Primary Examiner* — Lina M Cordero
(74) *Attorney, Agent, or Firm* — Nixon & Vanderhye (57) ABSTRACT

A method for the identification of the position of a first well, modelled by a distribution of poles, includes, after having determined an optimum position of each pole, determining a three-dimensional region of uncertainties around the optimum position of each pole, by applying a numerical method characterizing the differences between at least one measurement of the magnetic field and a disturbed theoretical magnetic field by varying the position of at least one pole and comparing a result of the numerical method with a threshold value. If the result is less than or equal to the threshold value, the disturbed position of the pole is considered in the region. The region is thus defined with a centre corresponding to the optimum position of the pole and the radii of which have a length at least equal to the maximum difference between the acceptable positions of the poles and the optimum position.

20 Claims, 5 Drawing Sheets

(51) Int. Cl.
 E21B 47/022 (2012.01)
 G01V 3/26 (2006.01)
 E21B 47/092 (2012.01)
(52) U.S. Cl.
 CPC ............ *E21B 47/0228* (2020.05); *G01V 3/26* (2013.01); *G01V 2210/667* (2013.01)

(56) References Cited

U.S. PATENT DOCUMENTS

| | | | |
|---|---|---|---|
| 5,485,089 A | 1/1996 | Kuckes | |
| 5,512,830 A * | 4/1996 | Kuckes | E21B 47/00 324/346 |
| 2003/0046005 A1 * | 3/2003 | Haarstad | E21B 47/022 702/9 |
| 2003/0121657 A1 * | 7/2003 | Chia | E21B 47/022 166/255.2 |
| 2008/0275648 A1 * | 11/2008 | Illfelder | E21B 47/022 702/7 |
| 2010/0241410 A1 | 9/2010 | McElhinney et al. | |

OTHER PUBLICATIONS

Buchanan et al., Geomagnetic Referencing—the Real-Time Compass for Directional Driller, Oilfield Review (Year: 2013).*
Derby et al., "Cylindrical Magnets and Ideal Solenoids", Sep. 2009, arXiv:0909.3880v1.
FR Search Report, dated Aug. 10, 2017, from corresponding FR application No. 1751933.

* cited by examiner

| p (%) | v | | | | | |
|---|---|---|---|---|---|---|
| | 1 | 2 | 3 | 4 | 5 | 6 |
| 68.3 | 1.00 | 2.30 | 3.53 | 4.72 | 5.89 | 7.04 |
| 90 | 2.71 | 4.61 | 6.25 | 7.78 | 9.24 | 10.6 |
| 95.4 | 4.00 | 6.17 | 8.02 | 9.70 | 11.3 | 12.8 |
| 99 | 6.63 | 9.21 | 11.3 | 13.3 | 15.1 | 16.8 |
| 99.73 | 9.00 | 11.8 | 14.2 | 16.3 | 18.2 | 20.1 |
| 99.99 | 15.1 | 18.4 | 21.1 | 23.5 | 25.7 | 27.8 |

$$\begin{bmatrix} \text{sigma H} & \text{CovLH} & \text{CovAH} \\ & \text{sigma L} & \text{CovLA} \\ \cdots & & \text{sigma A} \end{bmatrix}$$

Fig. 10

METHOD FOR THE IDENTIFICATION OF THE POSITION OF A WELL BY PASSIVE MAGNETIC TELEMETRY

BACKGROUND OF THE INVENTION

Field of the Invention

The present application relates to a method for the identification of the position of a wellbore in a terrain.

It relates more particularly to the identification of the position of a first wellbore (also occasionally called "target well") with respect to a second wellbore and, consequently, its distance and its orientation (or direction) with respect to the second wellbore (also occasionally called "reference well").

The first well denotes here a borehole that already exists. Such a well conventionally comprises ferromagnetic parts, for example a casing string, a casing, a drill string, completion strings or other.

The second wellbore can be a new well, for example a relief well, an interception well; an abandoned well or a standard wellbore.

During well drilling operations, it is often useful to know its position with respect to a well that already exists, either in order to intercept it, or on the contrary to avoid a collision between the two wells.

Description of the Related Art

In order to do this, a method usually implemented is based on a principle of the presence of a magnetic field generated by a ferromagnetic structure. Such method is for example known as "Passive Magnetic Ranging" (PMR), i.e. a passive magnetic telemetry method.

Such a method is called "passive" as it makes it possible to deduce the position of the first well relatively, in relation to the second well, and vice versa, thanks to measurements of the existing magnetic field.

In such a method, starting from the fact that the first well already exists, different measurements of the magnetic field are taken during drilling of the second well.

During drilling means here that the measurements can be taken as the drilling is carried out, or, once a determined depth has been reached, several measurements are taken along the borehole previously produced; for example it is possible to take these measurements while ascending in the well from the depth reached.

These measurements comprise for example measurements of magnetic field in a co-ordinate system associated with the measurement instrument as a function of the position at which each measurement was taken.

The position at which each measurement is taken is generally identified relatively in relation to the preceding position at which another measurement was taken, or an initial position of the tool from which the measurements are taken, for example using a given borehole depth, in particular using a curvilinear abscissa, and a measured orientated vector in azimuth and inclination. A method known as "minimum of curvature" makes it possible to join up each of the independent measurement points with each other in order to determine a trajectory, i.e. a set of points positioned relative to one another. However, it is for example possible to convert these relative positions into a position in a frame of reference called "absolute", i.e. with respect to a terrestrial frame of reference. For example, each measurement point, or the trajectory determined from the measurement points, can then be defined in a terrestrial absolute frame of reference.

Starting from these measurements, the relative position of the first well (i.e. the position of the first well with respect to the second well, and therefore with respect to the positions at which the measurements were taken) is then approximated, for example according to a geometrical method, or according to a spatial vector modelling of the magnetic field, or also according to a method of the theoretical distribution of magnetic poles along the first well.

In this last method, the first well is numerically modelled by a distribution of poles, which distribution corresponds to a theoretical magnetic field.

The positions of these poles, which are relative with respect to at least one measurement point of the second well, or absolute in a terrestrial frame of reference, therefore represent the position of the first well.

However, as these positions are determined by a numerical modelling, it is preferable to recognize a margin of error associated with these positions determined in this way.

Figure 2:
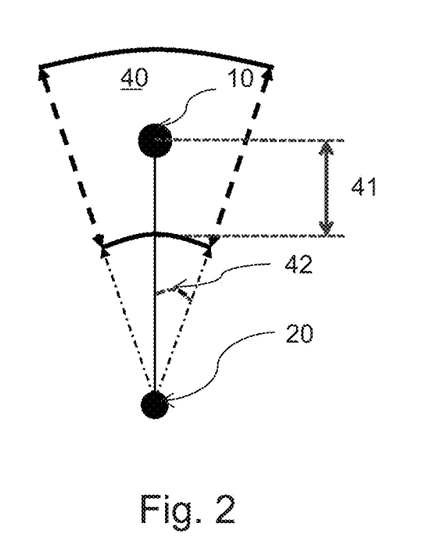
FIG. 2 presents in diagrammatic form a two-dimensional uncertainty region 40 in a conventional PMR method.

In a conventional PMR method, these margins of error are given in an arbitrary fashion, by identifying a physical region around the identified position of the first well, generally established as a percentage of distance with respect to the second well and as an angular uncertainty in degrees, also with respect to the second well. These uncertainties are generally independent of the method used and of the data associated with the case in question, and are in two dimensions only. Moreover, the associated confidence level is unknown. An example of such a region is represented in FIG. 2, commented on later in connection with the list of figures.

Such an estimation of the uncertainties therefore represents a certain risk, in particular in case of under-estimation of the distance and of the error in distance, for example when one of the objectives associated with the identification of the position of the first well is to avoid a collision with the second well.

SUMMARY OF THE INVENTION

At least one of the objectives of the present application is therefore to resolve, at least partially, the aforementioned drawbacks, while leading moreover to other advantages.

The method, which is a subject of the present application, aims in particular to propose a method for the quantification and identification of the uncertainties associated with the position of the first well.

To this end, according to a first aspect, a method for the identification of the position of a first well is proposed, the method comprising:

A step of capturing a data series comprising at least one measurement of the magnetic field at two distinct measurement points, at a distance from the first well;

A step of choosing a numerical model comprising:
a step of determining a model representing the first well by a distribution of at least one pole; and
a step of choosing a numerical method characterizing the differences between the at least one measurement of the magnetic field and a theoretical magnetic field originating from the model representing the first well;

A step of determining an optimum position of the at least one pole as a function of the numerical method chosen; and A step of calculating positional uncertainties of the distribution of at least one pole comprising:

A step of determining a three-dimensional region of uncertainties (or confidence region) around the optimum position of the at least one pole, this step comprising:

A step of determining a disturbed distribution of at least one pole in which the optimum position of at least one pole is directly modified, with respect to its optimum position, into a disturbed position of the at least one pole;

A step of calculating a disturbed theoretical magnetic field in which the disturbed theoretical magnetic field is calculated as a function of the disturbed distribution of at least one pole;

A step of comparing the at least one measurement of magnetic field and the disturbed theoretical magnetic field;

A step of applying the numerical method characterizing the differences between the at least one measurement of the magnetic field and the disturbed theoretical magnetic field;

A step of comparing a result of the numerical method with a determined threshold value as a function of a desired confidence level;

If the result of the test is less than or equal to the threshold value, then the disturbed position of the at least one pole is considered in the three-dimensional region of uncertainties; and A step of defining the three-dimensional region of uncertainties in the form of a variance-covariance matrix describing an ellipsoid of uncertainty containing the set of the accepted disturbed positions of the at least one pole and of which a centre of the ellipsoid corresponds to the optimum position of the at least one pole and of which each principal axis has a length at least equal to the greatest distance, or even double the larger distance, between an accepted disturbed position in the direction of the axis and the optimum position of the at least one pole.

At least some of the steps are for example reproduced successively and iteratively until the set of the disturbed positions of the at least one pole considered in the three-dimensional region of uncertainty has been determined.

A "measured magnetic field", corresponds to three components measured directly by a device of measurement instruments (such as magnetometer) in the second well.

A "theoretical magnetic field" corresponds to a modelling of the measured magnetic field. This modelling takes into account the global terrestrial magnetic field, the local magnetic field of the earth's crust, the diurnal variable magnetic field, the stray magnetic field produced by the drill string, the field produced by magnetic mud (these two last elements are due to ferromagnetic elements in the second well (drilling well), and finally the magnetic field produced by the ferromagnetic elements in the first well.

In this description the components of the theoretical field which are modified by the modelling are in particular the magnetic field due to ferromagnetic elements in the second well and the magnetic field emitted by ferromagnetic elements in the first well.

The method, which is the subject of the present application, makes it possible for example to provide results in a calculation time which is reasonable and compatible with the drilling time of the second well. And, by way of example, if the data quality allows, the results can be provided in less than an hour, even less than a minute with more powerful calculators.

A minimization of the differences between the theoretical magnetic field and the measured magnetic field, for example a least-squares minimization, makes it possible to determine a distribution of these poles, i.e. the theoretical position of each of the poles, corresponding to the theoretical magnetic field which minimizes the least squares at the level of the measurement points. In other words, it is a question of determining the position of each of the poles so that the theoretical magnetic field generated corresponding to the distribution of poles in these positions makes it possible to best approximate, or even retrieve, the measurements of the magnetic field.

These positions are possibly determined with respect to at least one measurement point of the second well but can be transposed into other frames of reference if necessary.

In an embodiment example, the step of calculating a disturbed theoretical magnetic field comprises moreover:

a step of varying at least one parameter of the numerical model, said step in which at least one parameter of the numerical model is disturbed;

the step of calculating the disturbed theoretical magnetic field, in which the disturbed theoretical magnetic field is calculated as a function of the at least one disturbed parameter of the numerical model; and a sub-step of determining the disturbed distribution of at least one pole, in which the disturbed position of at least one pole is determined as a function of the disturbed theoretical magnetic field.

For example, the at least one parameter of the numerical model which is disturbed during the step of varying at least one parameter of the numerical model is chosen from a force of at least one pole, or at least one data item from the data series captured.

In a preferred embodiment, the numerical method characterizing the differences between the at least one measurement of the magnetic field and a theoretical magnetic field originating from the model representing the first well comprises a Khi2 test representing the differences.

According to another embodiment, the numerical method characterizing the differences between the at least one measurement of the magnetic field and a theoretical magnetic field originating from the model representing the first well comprises a Monte-Carlo method.

Optionally, the two methods can be coupled.

In an embodiment example, at least one pole of the distribution of the model representing the first well is a point monopole, having a position and a force, or a distributed pole. "Distributed" means for example that the pole is itself distributed, for example according to a Gaussian or an exponential distribution, which can be unilateral or bilateral, or another distribution.

In an embodiment example, the distribution of at least one pole of the model comprises a regular distribution of poles, or an exponential distribution of poles, or a Gaussian distribution of poles, or a distribution of poles corresponding to a cylindrical magnet, i.e. which emits a magnetic field similar to that of a cylindrical magnet. Such a distribution is presented in a series of articles, such as for example in Cylindrical Magnets and Ideal Solenoids, Norman Derby & Stanislaw Olbert, arXiv:0909.3880v1.

For example, the step of applying the numerical method characterizing the differences between the at least one measurement of magnetic field and the disturbed theoretical magnetic field provides a value of Khi2 denoted Khi2', and the threshold value is defined by [Khi2min+DeltaKhi2], such that if Khi2'≤[Khi2min+DeltaKhi2], the disturbed position of the pole is considered in the three-dimensional region of uncertainties, with DeltaKhi2 determined according to a desired confidence level.

For example, the data series comprises moreover, for each measurement point, a position of the measurement point.

For example, the method comprises a step of providing, for each measurement point, the position, in distance and in direction, of a pole of the distribution representing the first well which is the closest to said measurement point.

BRIEF DESCRIPTION OF THE DRAWINGS

The invention, according to an embodiment example, will be better understood and its advantages will become more apparent on reading the following detailed description, given by way of indication and in no way limitative, with reference to the attached drawings in which.

DESCRIPTION OF THE PREFERRED EMBODIMENTS

Identical elements represented in the aforementioned figures are identified by identical numerical references.

Figure 1:
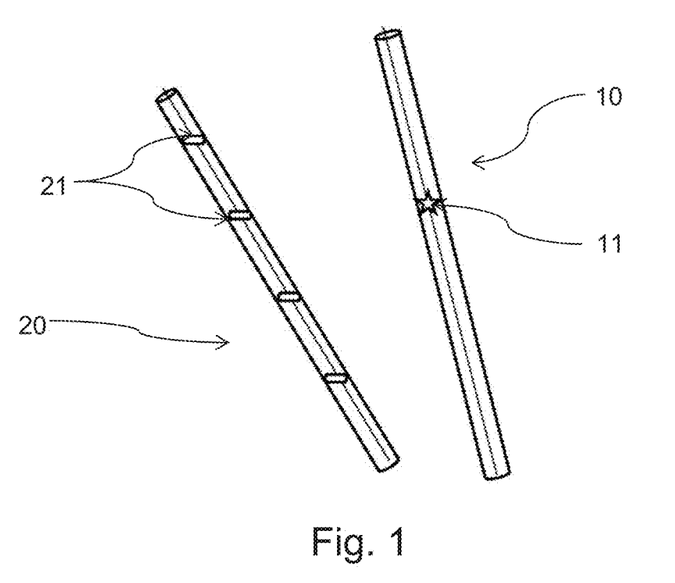
FIG. 1 presents in diagrammatic form a first well 10 with a pole 11, and a second well 20 with measurement points 21, also called "stations" or "measurement stations"

FIG. 1 illustrates a first well 10 (also called "target well"), on the right, the position of which is sought, and a second well 20 (also called "reference well"), on the left.

To this end, on the one hand, at least one measurement, generally several measurements, is(are) taken at different positions during the drilling of the second well 20; it being understood that during the drilling means here that the measurements can be taken as the drilling is carried out, or, once a determined depth has been reached, one or more measurements are taken along the borehole previously produced; it is for example possible to take these measurements while ascending the second well 20 from a certain depth reached.

The position at which a measurement is taken is called "station" 21, or "measurement station" 21, or also "point" 21 or "measurement point" 21.

In a PMR ("Passive Magnetic Ranging") method, i.e. a passive magnetic telemetry method, these measurements correspondent to measurements of the magnetic field. In fact, this method is based on a principle of the presence of a magnetic field generated by a ferromagnetic structure.

Thus, at each station 21, a total magnetic field is measured; the total magnetic field thus measured comprising a measurement of the terrestrial magnetic field (which exists naturally) and a measurement of a local magnetic field induced by the presence of the first well 10. Each measurement of the magnetic field at a point (i.e. at a station 21) thus comprises, for example, the measurement of total magnetic field along three orthogonal axes. The magnetic field induced by the presence of the first well 10 can therefore be deduced from the measurements by subtracting the terrestrial magnetic field, which is generally known for a given place, therefrom.

In other words, the first well 10 induces a local disturbance of the terrestrial magnetic field.

On the other hand, the first well 10, the position of which is to be determined, is modelled, in particular by a distribution of poles 11, for example of magnetic poles.

In an embodiment example, a method for the identification of the position of a first well, then comprises:

A step of capturing a data series comprising at least one measurement of the magnetic field (either of the total magnetic field measured or of this field from which the terrestrial field has been deducted beforehand) at two distinct points, at a distance from the first well 10, for example at two stations 21 of the second well 20;

A step of choosing a numerical model comprising:
  a step of determining a model representing the first well 10 by a distribution of at least one pole 11; and
  a step of choosing a numerical method characterizing differences between the at least one measurement of the magnetic field and a theoretical magnetic field (B theo) originating from the model representing the first well; and A step of determining an optimum position of the at least one pole as a function of the numerical method chosen.

In fact, the modelling of the first well 10 by a distribution of poles 11 makes it possible to calculate a theoretical magnetic field (B theo) induced by a given distribution of poles 11.

A comparison between this theoretical magnetic field (B theo) and the measured magnetic field (taking into account or not taking into account the terrestrial magnetic field in the two cases) makes it possible to calculate a difference between these two fields, for the corresponding distribution of poles.

Thus, for example by an iterative method, an optimum position of each pole 11 of the distribution of poles can be determined so that the differences between a theoretical magnetic field (generated by the distribution of poles in which each pole 11 is at an optimum position) and the measured magnetic field are minimal.

Figure 3:
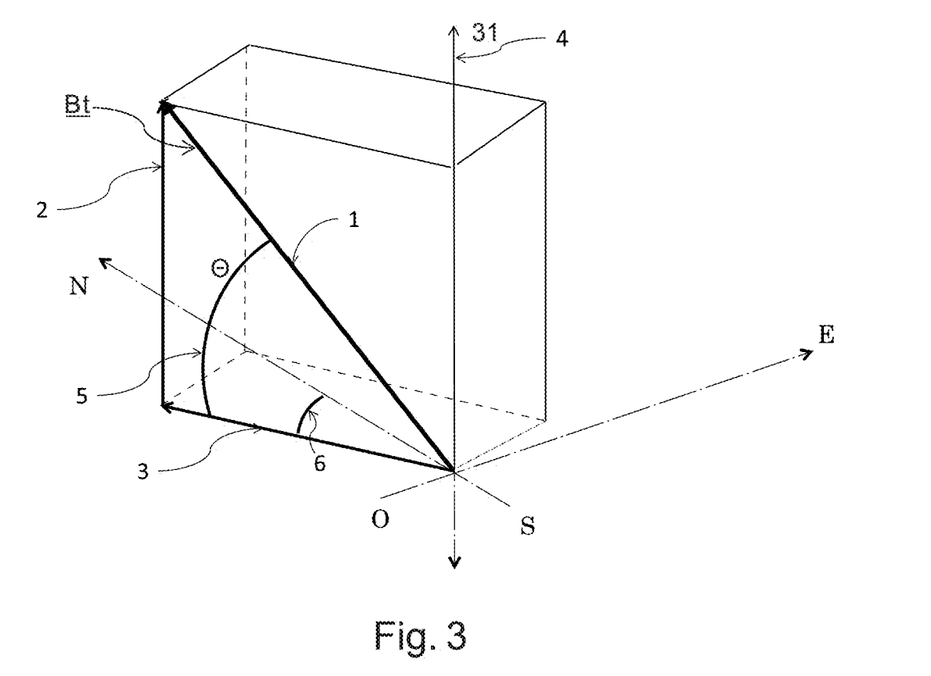
FIG. 3 illustrates a definition of an angle of inclination of the magnetic field Bt (called "dip angle": ⊖), and of declination (D) in a terrestrial frame of reference, where N indicates the direction of geographic North and E the direction of geographic East.
Figure 4:
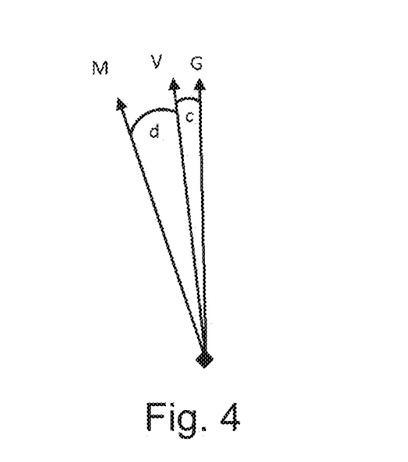
FIG. 4 illustrates a angle of convergence "c" between cartographic North G and geographic North V and an angle of declination "d" between geographic North V and magnetic North M.

In an embodiment example, the data series comprises for example, in an overall fashion for the second well 20:

A reference magnetic field value comprising at least one of the following:
- A value of the intensity of the terrestrial magnetic field (Bt),
- An angle of inclination of the terrestrial magnetic field (Bt) ("dip angle": $\ominus$), (see FIG. 3),
- A declination (D) of the terrestrial magnetic field (Bt), (see FIG. 3),
- A convergence "c", which represents an angle between cartographic North (or grid), represented by the arrow G in FIG. 4, and geographic North (or true North), represented by the arrow V in the same figure.

Figure 5:
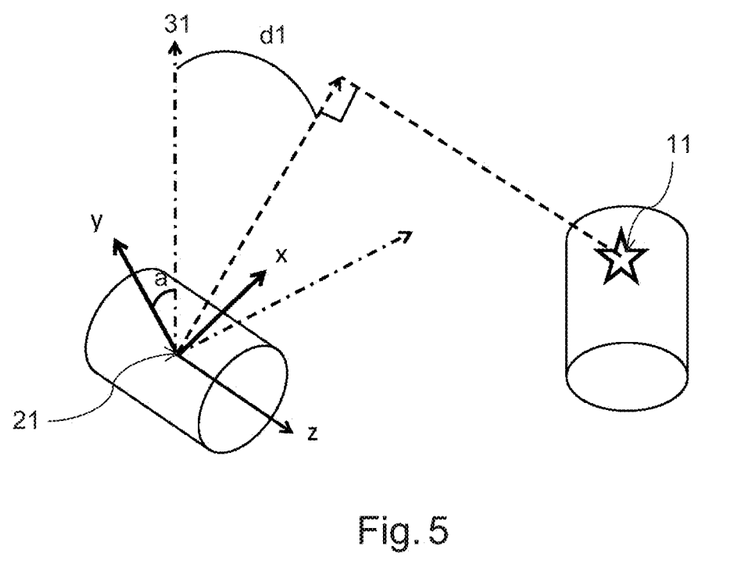
FIG. 5 illustrates a definition of a Cartesian frame of reference associated with a measurement instrument, at a measurement point 21, as well as the definition of the angle "a" also called "toolface angle" with respect to the direction called "highside" 31 (direction perpendicular to the direction of drilling in a vertical plane containing the direction of drilling)

FIG. 5 represents a Cartesian frame of reference (X, Y, Z) centred on a measurement point 21 and associated with the measurement instrument. Thus, the direction Z corresponds here to a borehole-depth direction. This figure also illustrates the definition of the angle "a" with respect to the direction called "highside" 31.

In an embodiment example, the data series comprises for example, at each measurement point 21, at least one of the following:

A measurement of the components of the total magnetic field B presented in the frame of reference associated with the measurement instrument (Bx, By, Bz), this frame of reference is illustrated in FIG. 5, from which it is possible to deduct the local magnetic field induced by the presence of the first well 10;

An item of information on the position of the measurement point 21 (given that the set of positions of each measurement point 21 makes it possible to describe the trajectory of the second well 20), described by:
- A measurement of depth, i.e. of distance drilled, (MD) of the measurement point 21 with respect to a reference point generally representing the start of the borehole of the second well 20,
- An inclination (I) if the gravitational field is unknown, otherwise it is possible to dispense with it,
- An azimuth (A), which can often be deduced from the total measured magnetic field B(Bx, By, Bz), but it can also originate from another source.

In a variant, if the inclination (I) is unknown, it is then useful for the data series to comprise a measurement of the local gravitational field G(Gx, Gy, Gz) at the measurement point 21.

Optionally, the data series can moreover comprise, at each measurement point 21, items of information relating to an architecture of the second well 20, in particular, for example, its casing program or casing string program, namely the diameters used, and their respective depths of use.

Optionally, the data series can moreover comprise items of information relating to the architecture of the first well 10, in particular, for example, its casing program or casing string program, namely the diameters used, and their respective depths of use.

In fact, the architecture of the wells is above all used for information, more than for modelling the well per se. It serves in particular for calculating the distances between the first well and the second well, in particular the radial distance between them.

The PMR method calculates a distance between the centres of the wells. Now, it is generally more useful to know the distance between the architectures of the two wells, i.e. for example from the edge of the casing of the first well 10 to the edge of the casing of the second well 20.

It is for example possible to determine this distance by knowing the positions of the centres of the two wells as well as the diameter of each casing and/or casing string.

The numerical model chosen comprises several parameters which can be input parameters or unknowns.

The numerical model comprises at least, on the one hand, the modelling of the first well, i.e. a numerical representation of the first well, and on the other hand, a characterization of the differences between the measurements of magnetic field (total or from which the terrestrial field has been deducted) and a theoretical magnetic field (B theo) originating from the model representing the first well 10.

The input parameters contribute to the definition of the model.

The model representing the first well comprises for example a distribution of poles 11, and/or the nature of each pole 11; each pole 11 being defined by a position and a total magnetic force. A distribution of poles 11 denotes here their distribution, a position of each pole, either with respect to another pole or in an absolute frame of reference, for example a terrestrial frame of reference. It is for example a regular distribution of poles, or an exponential distribution of poles, or a Gaussian distribution of poles, or other.

The nature of the pole 11 denotes here its structure: it can be a point pole, or a pole which is itself distributed, for example exponentially (exponential distribution of the pole), or according to a Gaussian distribution, or a distribution of poles equivalent to a cylindrical magnet or other.

In a case of a distributed pole, its position is defined by a position of a point of maximum force within the pole (such as for example the central point of a Gaussian distribution).

A numerical method makes it possible to characterize the differences between at least one measurement of the magnetic field and a theoretical magnetic field (B theo) originating from the model representing the first well. This numerical method can be based on a Khi2 minimization method; in a variant or as an option, this method can also be based on the principle of a method of Monte-Carlo type.

For example, input parameters of the model are:

For each (magnetic) pole i 11, denoted pi:
- The nature of the pole 11: point, exponential, cylindrical etc.
  - If the chosen pole 11 is exponential: length of exponential decay.
- di: distance between two successive pi poles, this is for example a curvilinear abscissa along the trajectory of the first well: if a multi-pole approach, values are determined by the user in a preliminary phase; this thus defines the distribution of the poles;
- Fi: force of each pole 11: if a multi-pole approach, relative values are determined by the user in a preliminary phase;
- Optionally: E: Location of the pole i: such a data item is not formally an input parameter, but an estimation which can be provided as an option;
- Ei={Xi, Yi, Zi}, in a Cartesian frame of reference (the origin of which is set as being the surface position of the target well, for example).

The unknowns form part of the parameters to be determined.

Therefore, it should be noted that the definition of the input parameters at least partially determines the unknowns of the model.

It relates for example to the following parameters:
The position of each pole: Ei,
The force associated with each pole: Fi.

The distribution of the poles 11 induces a magnetic field called theoretical, as a function of the hypotheses of the PMR Model:

B theo={Bx theo, By theo, Bz theo}.

A minimization method then makes it possible to approximate the optimum positions of the magnetic poles by minimizing the differences between the measurements of the magnetic field and the theoretical magnetic field until the optimum distribution of poles is determined, i.e. the position of each pole 11 which minimizes the differences between the measurements of the magnetic field and the corresponding theoretical magnetic field.

Figure 7:
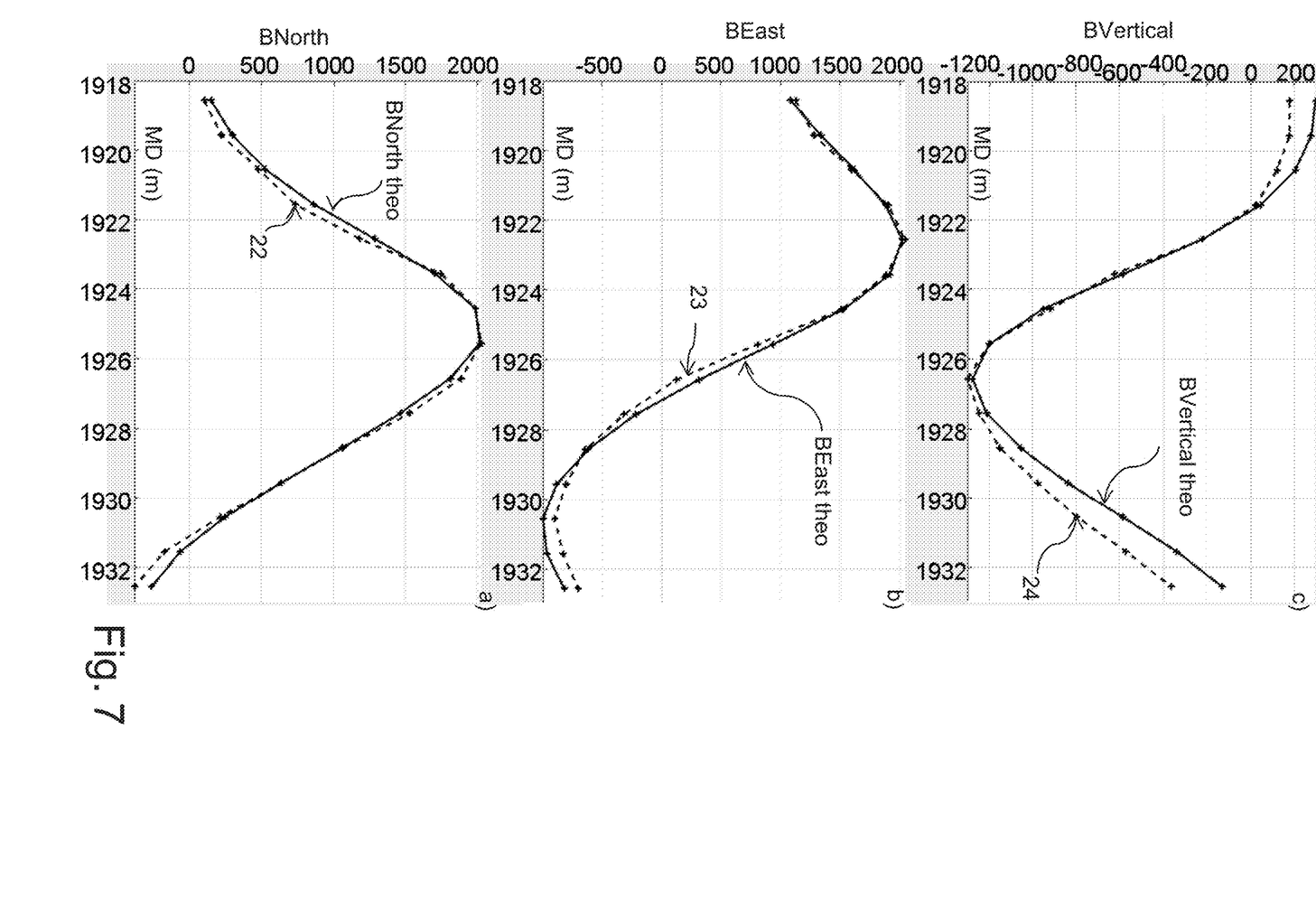

Such an approximation of the measurements of the magnetic field by a theoretical magnetic field (B theo) is for example illustrated by FIG. 7 on which the theoretical magnetic field is represented by a solid line curve and the measurements of the magnetic field (taken at each station 21) are connected by a dotted line.

In this illustrative example, represented respectively from bottom to top, FIG. 7a) represents the "North" component of the magnetic field B (BNorth) as a function of the depth MD in the second well 20 (in m) with respect to the North component of the measurements (denoted 22), FIG. 7b) represents the "East" component of the magnetic field B (BEast) as a function of the depth MD in the second well 20 (in m) with respect to the East component of the measurements (denoted 23) and FIG. 7c) represents the "vertical" component of the magnetic field B (BVertical) as a function of the depth MD in the second well 20 (in m) with respect to the Vertical component of the measurements (denoted 24).

Figure 6:
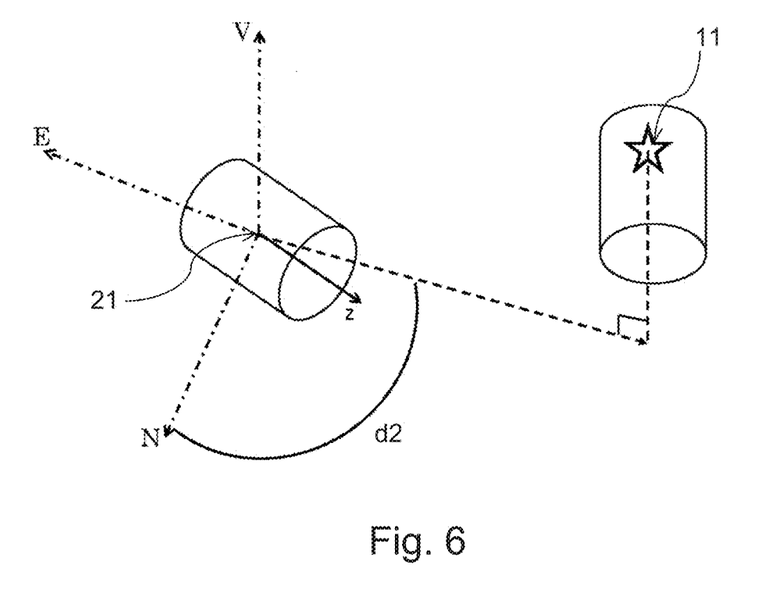
FIG. 6 illustrates a definition of an angle called "Apparent North to Target Well" i.e. an angle with respect to Apparent North indicating the direction in which the well 10 is situated, FIG. 7, composed of Figures a), b) and c) illustrates a modelling of a measured magnetic field, with FIG. 7a) which represents the "North" component of the magnetic field B (BNorth) as a function of the depth MD in the second well 20 (in m), FIG. 7b) which represents the "East" component of the magnetic field B (BEast) as a function of the depth MD in the second well 20 (in m) and FIG. 7c) which represents the "vertical" component of the magnetic field B (BVertical) as a function of the depth MD in the second well 20 (in m)

The directions North (N), East (E) and Vertical (V), for a measurement point 21, as well as the angle "Apparent North to Target" are represented by way of illustration in FIG. 6.

For example, by using a Khi2 minimization method, the theoretical magnetic field due to the first well 10 is compared with the measurements of the magnetic field (taking into account or not taking into account the terrestrial field, in the two cases), in order to:
Determine the minimum Khi2, denoted Khi2min,
Optimize:
Fi
Ei When the Khi2min has been determined, Ei and Fi, respectively the position and the force of each pole i 11, correspond thereto.

The set of the positions of each pole i 11 makes it possible to identify the trajectory of the first well 10.

The Khi2 allows a representation of the quality of the model: the smaller Khi2, the better the modelling.

However, the method preferably comprises a step of verification that (reduced Khi2min) is equal to or less than 4 (reduced Khi2min≤4), with (reduced Khi2min) which is Khi2min divided by the number of degrees of freedom v (reduced Khi2min=Khi2min/v).

Otherwise, i.e. if (reduced Khi2min) is greater than 4, it is preferable to use a method other than the Khi2 method, such as for example a method of Monte-Carlo type, as, in this case, the results of the Khi2 method are not very reliable.

In a method of Monte-Carlo type, another example of a method for the minimization of the differences between the measurements of the magnetic field and the theoretical magnetic field, it is a question of randomly varying a part of the set of parameters and of proceeding with comparative tests until a minimum value is determined to which an optimum distribution of poles corresponds.

Each pole 11 has a station 21, i.e. a measurement point 21, which is the closest one in the second well 20. This leads for example to a step of providing at least one of the following parameters:
Ei={Xi, Yi, Zi}, with Ei the position of the pole i 11 considered (determined beforehand),
A distance between the closest station 21 and the pole i 11 considered,
A first direction: an angle d1 called "Highside to Target Well" for the pole i 11 considered, i.e. an angle with respect to the "highside" direction 31 indicating a first direction in which the first well 10 is situated (see FIG. 5).
A second direction: an angle d2 called "Apparent North to Target Well" for the pole i 11 considered, i.e. an angle with respect to apparent North indicating a second direction in which the first well 10 is situated (see FIG. 6).

At this stage, the method therefore provides a representation of the first well 10, namely:
for each measurement point 21, the position (distance and direction) of the closest pole 11.

It is for example the distance between the measurement point 21 and the closest pole 11, and the angle "d1" in a Cartesian frame of reference associated with the second well 20 with respect to a main direction generally called "highside direction" 31, such as for example the Cartesian frame of reference represented in FIG. 5.

Therefore from now on it is a question of knowing the uncertainties associated with the modelling which has led to the determination of the optimum distribution of the set of poles 11, and therefore of the trajectory of the first well 10.

Conventionally, the methods used provide a region of uncertainties such as that represented in FIG. 2. In such a region, the margins of error (uncertainties) are given arbitrarily around the identified position of the first well 10 (in particular around the optimum position of each pole 11). Thus, for example, such region 40 is formed by a radial uncertainty 41 and an angular uncertainty 42, with the radial uncertainty 41 (which represents an uncertainty over the distance between the two wells) which is a percentage of distance of the first well 10 with respect to the second well 20 and the angular uncertainty 42 (which represents an uncertainty in direction/orientation of the first well 10 with respect to the second well 20) which is in degrees, also with respect to the second well 20. These uncertainties are generally independent of the method used and of the data associated with the case in question, and are in two dimensions only. Moreover, the associated confidence level is unknown.

Figures 8, 9:
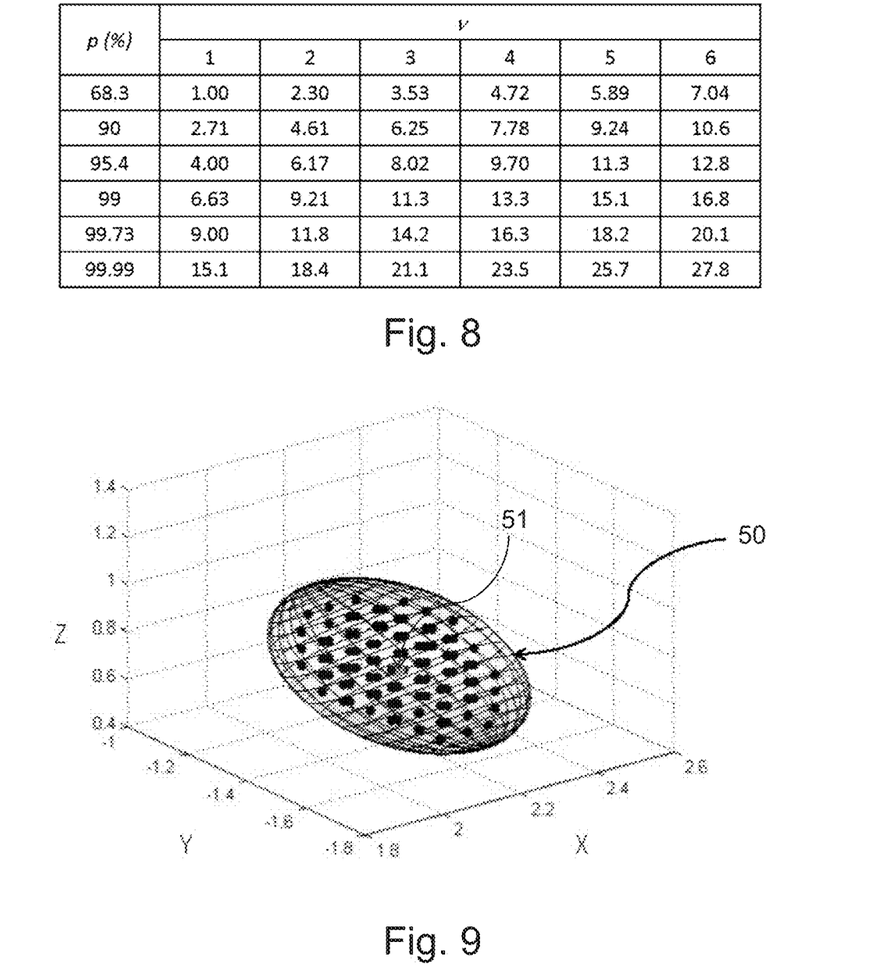
FIG. 8 shows a table determining a DeltaKhi2 as a function of a confidence level "p" and of the number of degrees of freedom "v" of the model.
FIG. 9 shows an example of an area of uncertainty associated with a pole of the distribution of the model representing the first well in an embodiment example of the present invention.

According to an embodiment example of the method according to the invention, the method comprises a step of calculating position uncertainties of each of the poles 11 of the pole distribution representing the first well with respect to an optimum position, said step comprising for example:
A step of determining a three-dimensional region of uncertainties 50 (or confidence region) around the optimum position 51 of the at least one pole 11 of the model representing the first well 10, which comprises for example:

A step of disturbing a distribution of at least one pole in which at least one pole 11 has a disturbed position with respect to its optimum position;

A step of calculating a disturbed theoretical magnetic field (B theo disturbed) as a function of the disturbed distribution of at least one pole;

A step of comparing the disturbed theoretical magnetic field (B theo disturbed) with the at least one measurement of the magnetic field;

A step of applying the numerical method characterizing the differences between the at least one measurement of the magnetic field and the disturbed theoretical magnetic field (B theo disturbed);

A step of comparing a result of the numerical method with a determined threshold value as a function of a desired confidence level;

If the result of the test is less than or equal to the threshold value, then the disturbed position of the at least one pole is considered in the three-dimensional region of uncertainties.

The steps are for example reproduced successively and iteratively until the set of the disturbed positions of the at least one pole considered in the three-dimensional region of uncertainty has been determined.

The step of calculating uncertainties can moreover comprise for example:

A step of defining the three-dimensional region of uncertainties 50, for example represented in the form of a variance-covariance matrix which describes an ellipsoid of uncertainty containing the accepted set of disturbed poles; the centre of which corresponds to the optimum position 51 of the at least one pole 11 and the lengths of the principal axes of which are at least equal to the greatest distance, or even double the greatest distance, between the accepted disturbed positions in the direction of the principal axes and the optimum position of the at least one pole.

In an embodiment example, the step of determining a disturbed distribution of at least one pole comprises:

a step of varying at least one parameter of the numerical model, said step in which at least one parameter of the numerical model is disturbed;

the step of calculating the disturbed theoretical magnetic field (B theo disturbed), in which the disturbed theoretical magnetic field is calculated as a function of the at least one disturbed parameter of the numerical model; and a sub-step of determining the disturbed distribution of at least one pole, in which the disturbed position of at least one pole is determined as a function of the disturbed theoretical magnetic field.

For example, the at least one parameter of the numerical model which is disturbed during the step of varying at least one parameter of the numerical model is chosen from the force of at least one pole, or at least one data item from the data series captured.

Thus, according to a particular embodiment example, the step of determining a three-dimensional region of uncertainties (or confidence region) around the optimum position of the at least one pole of the model representing the first well comprises for example:

A step of varying the location of each pole Ei in space: each position Ei then becomes Ei disturbed which becomes an input parameter of the model; it is for example possible to simultaneously vary the positions of all the poles 11;

A sub-step of calculating a disturbed theoretical magnetic field (B theo disturbed), in which the disturbed theoretical magnetic field is calculated as a function of the disturbed distribution of at least one pole, A step of comparing the measurements of the magnetic field with the disturbed theoretical magnetic field which corresponds to the pole distribution called disturbed, in which each pole is at the position Ei disturbed;

A step of calculating the corresponding Khi2, denoted Khi2';

A step of verifying Khi2'≤Khi2min+DeltaKhi2, with DeltaKhi2 determined according to a desired confidence level, as detailed below;

If the preceding inequality is satisfied (i.e. that the inequality is true), then the point is validated. This determines an EOU (Ellipsoid of Uncertainty) in 3D of the accepted points.

According to another embodiment, the parameter of the model which is disturbed is other than the positions of the poles: it is for example at least one data item from the data series captured, for example field measurement values.

In this case, according to the same method, the measured magnetic field is then a disturbed measured field to which correspond disturbed positions of the poles that are then determined from this disturbed measured magnetic field (B theo disturbed).

In other words, disturbances are introduced until it is possible to define the limits of the field outside of which the equation Khi2'≤Khi2min+DeltaKhi2 is no longer satisfied, in the case of applying a Khi2 method.

As mentioned previously, DeltaKhi2 is determined according to a desired confidence level according to the table given in FIG. 8.

Thus, by way of example, according to this figure, for a confidence level p of 68.3% and for 6 degrees of freedom, the value for DeltaKhi2 is then 7.04. In comparison, for a confidence level p of 99%, and 6 degrees of freedom, the DeltaKhi2 value is 16.8.

In other words, the higher the desired confidence level, the larger the area of uncertainty.

According to another example, if the method chosen is a method of Monte-Carlo type, the three-dimensional uncertainties are then for example determined according to the following steps:

A step of random variation of at least one part of the set of input parameters;

the step of calculating the disturbed theoretical magnetic field (B theo disturbed), in which the disturbed theoretical magnetic field is calculated as a function of the part of the set of randomly varied parameters;

A step of calculating the differences between the measurements of the magnetic field and the disturbed theoretical magnetic field obtained for each part of the set of randomly varied parameters;

A step of calculating a difference between on the one hand the differences between the measurements of the magnetic field and the theoretical magnetic field for each part of the set of randomly varied parameters and on the other hand a difference between the measurements of the magnetic field and the theoretical magnetic field determined according to the minimization method by the method of Monte Carlo type; and If the difference calculated is less than a determined value according to a desired confidence level, then the disturbed distribution corresponding to the part of the set of randomly varied parameters is retained. The set of the disturbed distributions corresponding to each part of the sets of retained randomly varied parameters then defines the envelope of the ellipsoid of uncertainties associated with the modelling.

Thus, for example, for each part of a set of randomly varied parameters, the method comprises a sub-step of determining the disturbed distribution of at least one pole which corresponds to the disturbed theoretical magnetic field (B theo disturbed) resulting therefrom.

Whatever the chosen method (in particular Khi2 or Monte-Carlo), at the output, the method therefore provides for example:

A three-dimensional (3D) variance-covariance matrix of uncertainties comprising:
  Diagonally: the variances of the EOU at a certain confidence level p, and
  Off-diagonal: the covariances which represent the orientation of an ellipsoid (the EOU) with respect to the Cartesian frame of reference considered (for example, if the value of the factors is 0, the axes of the ellipsoid are collinear to the axes of the frame of reference).

In other words, the method provides, for each measurement point 21, in addition to the position (distance and direction) of the closest pole 11, a region of uncertainties in three dimensions.

Thus, this makes it possible for any software to represent the ellipsoid in three dimensions.

Such an ellipsoid 50 is for example represented in FIG. 9. It is centred on the point of Khi2min, i.e. the position 51 of a theoretically optimum pole 11.

Such method makes it possible to provide a set of parameters characterizing the positional uncertainty, for example in the form of a symmetrical matrix of dimension 3, comprising six parameters: the three variances and the three covariances between the axes. This variance-covariance matrix can be represented in 3D by an ellipsoid the axes of which are the three proper vectors of the matrix.

Figure 10:
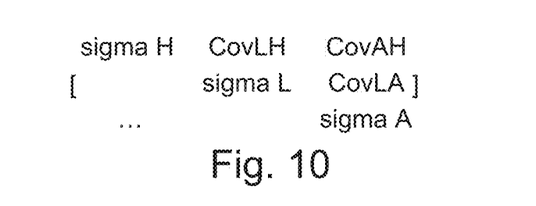
FIG. 10 presents an example of a three-dimensional uncertainties variance-covariance matrix, according to an embodiment example of the present invention.

In other words, it is a symmetrical 3×3 matrix, having diagonally the three variances on the axes of the chosen frame of reference (for example, in the frame of reference HLA, sigma H, sigma L, sigma A), and off-diagonal the three covariances of the three axes (CovLH, CovAH, CovLA). This matrix composed of six parameters, represented in FIG. 10, thus defines in 3D an ellipsoid of uncertainty at a given confidence level, which contains the probable position of the first well 10.

The invention claimed is:

1. A method for identifying a position of a first well, the method comprising:
  capturing a data series comprising at least one measurement of a magnetic field at two distinct measurement points, at a distance from the first well;
  choosing a numerical model comprising:
    determining a model representing the first well by a distribution of at least one pole, and
    selecting a numerical method characterizing differences between the at least one measurement of the magnetic field and a theoretical magnetic field originating from the model representing the first well;
  determining a position of the at least one pole as a function of the selected numerical method;
  calculating positional uncertainties of the distribution of the at least one pole comprising:
    determining a three-dimensional region of uncertainties around the position of the at least one pole, the determining the three-dimensional region of uncertainties comprising:
      determining a disturbed distribution of the at least one pole in which the position of the at least one pole is directly modified into a disturbed position of the at least one pole,
      calculating a disturbed theoretical magnetic field, in which the disturbed theoretical magnetic field is calculated as a function of the disturbed distribution of the at least one pole,
      comparing the at least one measurement of the magnetic field and the disturbed theoretical magnetic field,
      applying the selected numerical method characterizing differences between the at least one measurement of the magnetic field and the disturbed theoretical magnetic field,
      comparing a result of the numerical method with a determined threshold value as a function of a desired confidence level,
      when the result is less than or equal to the determined threshold value, then the disturbed position of the at least one pole is accepted and considered in the three-dimensional region of uncertainties, and
      defining the three-dimensional region of uncertainties as a variance-covariance matrix describing an ellipsoid of uncertainty containing an accepted set of disturbed positions of the at least one pole, of which a center of the ellipsoid corresponds to the position of the at least one pole, and of which each principal axis has a length at least equal to a greatest distance between the accepted disturbed position in a direction of a principal axis and the position of the at least one pole; and
  outputting the determined three-dimensional region of uncertainties that is the variance-covariance matrix describing the ellipsoid of uncertainty to identify the position of the first well in relation to a second well.

2. The method according to claim 1, wherein the calculating the disturbed theoretical magnetic field comprises:
  varying at least one parameter of the numerical model, in which the at least one parameter of the numerical model is disturbed;
  calculating the disturbed theoretical magnetic field, in which the disturbed theoretical magnetic field is calculated as a function of the at least one disturbed parameter of the numerical model, and
  determining the disturbed distribution of the at least one pole, in which the disturbed position of the at least one pole is determined as a function of the at least one measurement of the magnetic field.

3. The method according to claim 2, wherein the at least one parameter of the numerical model which is disturbed is chosen from a force of the at least one pole, or at least one data item from the data series.

4. The method according to claim 3, wherein the selected numerical method characterizing the differences between the at least one measurement of the magnetic field and the theoretical magnetic field originating from the model representing the first well comprises a Khi2 test representing the differences.

5. The method according to claim 3, wherein the selected numerical method characterizing the differences between the at least one measurement of the magnetic field and the theoretical magnetic field originating from the model representing the first well comprises a Monte-Carlo method.

6. The method according to claim 3, wherein the at least one pole of the distribution of the model representing the first well is a point monopole, having a position and a force, or a distributed pole.

7. The method according to claim 2, wherein the selected numerical method characterizing the differences between the at least one measurement of the magnetic field and the theoretical magnetic field originating from the model representing the first well comprises a Khi2 test representing the differences.

8. The method according to claim 2, wherein the selected numerical method characterizing the differences between the at least one measurement of the magnetic field and the theoretical magnetic field originating from the model representing the first well comprises a Monte-Carlo method.

9. The method according to claim 2, wherein the at least one pole of the distribution of the model representing the first well is a point monopole, having a position and a force, or a distributed pole.

10. The method according to claim 2, wherein the distribution of the at least one pole of the model comprises a regular distribution of poles, or an exponential distribution of poles, or a Gaussian distribution of poles, or a distribution of poles corresponding to a cylindrical magnet.

11. The method according to claim 1, wherein the selected numerical method characterizing the differences between the at least one measurement of the magnetic field and the theoretical magnetic field originating from the model representing the first well comprises a Khi2 test representing the differences.

12. The method according to claim 4, wherein the selected numerical method characterizing the differences between the at least one measurement of the magnetic field and the theoretical magnetic field originating from the model representing the first well comprises a Monte-Carlo method.

13. The method according to claim 11, wherein the at least one pole of the distribution of the model representing the first well is a point monopole, having a position and a force, or a distributed pole.

14. The method according to claim 1, wherein the selected numerical method characterizing the differences between the at least one measurement of the magnetic field and the theoretical magnetic field originating from the model representing the first well comprises a Monte-Carlo method.

15. The method according to claim 14, wherein the at least one pole of the distribution of the model representing the first well is a point monopole, having a position and a force, or a distributed pole.

16. The method according to claim 1, wherein the at least one pole of the distribution of the model representing the first well is a point monopole, having a position and a force, or a distributed pole.

17. The method according to claim 1, wherein the distribution of the at least one pole of the model comprises a regular distribution of poles, or an exponential distribution of poles, or a Gaussian distribution of poles, or a distribution of poles corresponding to a cylindrical magnet.

18. The method according to claim 1, wherein the applying the selected numerical method characterizing the differences between the at least one measurement of the magnetic field and the disturbed theoretical magnetic field provides a Khi2 value denoted Khi2', and the determined threshold value is defined by [Khi2min+DeltaKhi2], such that when Khi2'≤[Khi2min+DeltaKhi2], the disturbed position of the at least one pole is considered in the three-dimensional region of uncertainties, with DeltaKhi2 determined according to a desired confidence level.

19. The method according to claim 1, wherein the data series further comprises, for each measurement point, a position of the measurement point.

20. The method according to claim 1, further comprising providing, for each measurement point, a position, in distance and in direction, of a pole of the distribution representing the first well which is the closest to said measurement point.

* * * * *